(12) United States Patent
Barzel et al.

(10) Patent No.: US 9,244,745 B2
(45) Date of Patent: *Jan. 26, 2016

(54) ALLOCATING TASKS BY SENDING TASK-AVAILABLE MESSAGES REQUESTING ASSISTANCE WITH AN IMAGE PROCESSING TASK FROM A SERVER WITH A HEAVY TASK LOAD TO ALL OTHER SERVERS CONNECTED TO THE COMPUTER NETWORK

(75) Inventors: Ron Barzel, Truckee, CA (US); Felix S. Hsu, Fremont, CA (US); Ronald S. Cok, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 1005 days.

This patent is subject to a terminal disclaimer.

(21) Appl. No.: 13/161,634

(22) Filed: Jun. 16, 2011

(65) Prior Publication Data

US 2012/0324096 A1    Dec. 20, 2012

(51) Int. Cl.
| | |
|---|---|
| G06F 9/46 | (2006.01) |
| G06F 15/16 | (2006.01) |
| G06F 15/173 | (2006.01) |
| G06F 9/50 | (2006.01) |
| H04L 29/08 | (2006.01) |

(52) U.S. Cl.
CPC .............. *G06F 9/5088* (2013.01); *G06F 9/505* (2013.01); *G06F 9/5083* (2013.01); *H04L 67/1002* (2013.01); *H04L 67/1008* (2013.01); *H04L 67/1012* (2013.01); *H04L 67/1029* (2013.01)

(58) Field of Classification Search
CPC ............ H04L 67/1008; H04L 67/1029; H04L 67/1012; H04L 67/1002; G06F 9/5088; G06F 9/5083; G06F 9/505

USPC .......... 709/224, 201, 223, 226, 235; 345/502; 718/105

See application file for complete search history.

(56) References Cited

U.S. PATENT DOCUMENTS

| | | | | |
|---|---|---|---|---|
| 5,603,031 | A * | 2/1997 | White et al. .................. | 719/317 |
| 6,023,586 | A * | 2/2000 | Gaisford et al. ............. | 717/178 |
| 6,067,580 | A * | 5/2000 | Aman et al. .................. | 719/330 |
| 6,076,174 | A * | 6/2000 | Freund ......................... | 714/47.3 |
| 6,112,243 | A * | 8/2000 | Downs ................. | G06F 9/5044 709/219 |
| 6,185,601 | B1* | 2/2001 | Wolff ............................ | 709/203 |
| 6,304,967 | B1* | 10/2001 | Braddy ......................... | 713/150 |
| 6,378,129 | B1* | 4/2002 | Zetts ............................... | 725/94 |
| 6,438,652 | B1* | 8/2002 | Jordan .................... | G06F 9/505 709/219 |
| 6,473,085 | B1* | 10/2002 | Brock et al. .................. | 345/502 |
| 6,772,211 | B2* | 8/2004 | Lu et al. ........................ | 709/226 |
| 6,857,012 | B2* | 2/2005 | Sim et al. ...................... | 709/222 |
| 6,944,678 | B2* | 9/2005 | Lu et al. ........................ | 709/245 |
| 6,970,939 | B2* | 11/2005 | Sim .............................. | 709/236 |
| 7,032,037 | B2* | 4/2006 | Garnett et al. .................... | 710/2 |
| 7,047,287 | B2* | 5/2006 | Sim et al. ...................... | 709/221 |
| 7,058,014 | B2* | 6/2006 | Sim .............................. | 370/230 |
| 7,117,269 | B2* | 10/2006 | Lu et al. ........................ | 709/238 |

(Continued)

*Primary Examiner* — Daniel C Murray
(74) *Attorney, Agent, or Firm* — Hogan Lovells LLP

(57) ABSTRACT

A plurality of server computers connected to computer network processes tasks that are unequally distributed among the server computers. A server sends a task-available message over the computer network to the remaining server computers to request assistance. The received task-available message is processed by some of the servers while others of the servers do not process the message because they are too busy. The servers that process the message respond by requesting a task from the message sending server.

16 Claims, 10 Drawing Sheets

(56) References Cited

U.S. PATENT DOCUMENTS

| | | | |
|---|---|---|---|
| 7,181,523 B2 * | 2/2007 | Sim | 709/226 |
| 7,284,067 B2 * | 10/2007 | Leigh | 709/238 |
| 7,437,473 B2 * | 10/2008 | Lu et al. | 709/236 |
| 7,661,015 B2 * | 2/2010 | Revanuru et al. | 714/4.1 |
| 7,757,236 B1 | 7/2010 | Singh | 718/105 |
| 7,930,427 B2 * | 4/2011 | Josefsberg et al. | 709/245 |
| 7,937,490 B2 * | 5/2011 | Lu et al. | 709/235 |
| 7,969,919 B1 * | 6/2011 | Snodgrass | 370/270 |
| 7,974,216 B2 * | 7/2011 | Dini et al. | 370/254 |
| 7,979,870 B1 * | 7/2011 | Pulsipher | 719/330 |
| 8,028,293 B2 * | 9/2011 | Azar et al. | 718/105 |
| 8,122,146 B1 * | 2/2012 | Lu et al. | 709/236 |
| 8,201,219 B2 * | 6/2012 | Jones | 726/3 |
| 8,244,854 B1 * | 8/2012 | Pulsipher | 709/224 |
| 8,250,131 B1 * | 8/2012 | Pulsipher | 709/201 |
| 8,284,205 B2 * | 10/2012 | Miller et al. | 345/502 |
| 8,539,565 B2 * | 9/2013 | Beletski et al. | 726/7 |
| 2002/0026560 A1 * | 2/2002 | Jordan | G06F 9/505 711/120 |
| 2002/0078174 A1 * | 6/2002 | Sim et al. | 709/219 |
| 2002/0078263 A1 * | 6/2002 | Darling et al. | 709/331 |
| 2002/0083187 A1 * | 6/2002 | Sim et al. | 709/235 |
| 2002/0112069 A1 * | 8/2002 | Sim | 709/236 |
| 2002/0194342 A1 * | 12/2002 | Lu et al. | 709/227 |
| 2002/0194345 A1 * | 12/2002 | Lu et al. | 709/227 |
| 2003/0031176 A1 * | 2/2003 | Sim | 370/392 |
| 2003/0046369 A1 * | 3/2003 | Sim et al. | 709/220 |
| 2003/0105903 A1 * | 6/2003 | Garnett et al. | 710/300 |
| 2003/0158940 A1 * | 8/2003 | Leigh | 709/226 |
| 2003/0236813 A1 * | 12/2003 | Abjanic | 709/102 |
| 2004/0006622 A1 * | 1/2004 | Burkes et al. | 709/225 |
| 2005/0198238 A1 * | 9/2005 | Sim et al. | 709/222 |
| 2006/0031374 A1 * | 2/2006 | Lu et al. | 709/207 |
| 2007/0233896 A1 * | 10/2007 | Hilt et al. | 709/238 |
| 2009/0070489 A1 * | 3/2009 | Lu et al. | 709/245 |
| 2009/0083861 A1 * | 3/2009 | Jones | 726/29 |
| 2009/0109230 A1 * | 4/2009 | Miller et al. | 345/506 |
| 2009/0222583 A1 * | 9/2009 | Josefsberg et al. | 709/245 |
| 2009/0241176 A1 * | 9/2009 | Beletski et al. | 726/7 |
| 2011/0167112 A1 * | 7/2011 | Mazzucco et al. | 709/203 |
| 2012/0084350 A1 * | 4/2012 | Xie | 709/203 |
| 2012/0323988 A1 * | 12/2012 | Barzel et al. | 709/202 |
| 2012/0324095 A1 * | 12/2012 | Barzel et al. | 709/224 |
| 2013/0111467 A1 * | 5/2013 | Sundararaj | 717/176 |
| 2013/0141442 A1 * | 6/2013 | Brothers et al. | 345/502 |

* cited by examiner

US 9,244,745 B2

ALLOCATING TASKS BY SENDING TASK-AVAILABLE MESSAGES REQUESTING ASSISTANCE WITH AN IMAGE PROCESSING TASK FROM A SERVER WITH A HEAVY TASK LOAD TO ALL OTHER SERVERS CONNECTED TO THE COMPUTER NETWORK

CROSS REFERENCE TO RELATED APPLICATIONS

Reference is made to commonly assigned, co-pending U.S. Patent Applications:
Ser. No. 13/161,601 by Barzel et al. filed of even date herewith entitled "Task Allocation In A Computer Network";
Ser. No. 13/161,627 by Barzel et al. filed of even date herewith entitled "Task Allocation In A Computer Network"; and
Ser. No. 13/161,611 by Barzel et al. filed of even date herewith entitled "Image Processing In A Computer Network", the disclosures of which are incorporated herein by reference in their entireties.

FIELD OF THE INVENTION

The present invention relates to efficient interactions between computers in a network, and particularly to load balancing tasks in a network of independent servers.

BACKGROUND OF THE INVENTION

The distribution of work among a limited number of workers is a common problem found in everyday life. In one simple approach, each worker maintains a queue of tasks to keep busy. At times, however, a worker can complete the tasks and await further work, wasting time. In another simple approach, all tasks are allocated to a central task allocator. The central task allocator can monitor and dispatch tasks to the workers so that no workers are without work. Workers can have only one task in their queue at a time, or multiple tasks.

Computing task distribution among interconnected computers is an important problem in computer networks. Referring to FIG. 6, computer networks typically include multiple computers (e.g. client computers 10 and server computers 20) connected to a common computer communication network 15, for example the internet. In some computer networks, a server computer provides services to a client computer. The client computer can be a remote computer that accesses services over the computer network. The server computer, in turn, can access other networked computers providing services useful to the client for the benefit of the client instead of requiring the client to directly access those networked computers. In other computer networks, a group of computers is used to compute a single task, by dividing the task into separate portions that can be processed by different computers in the group of computers. In yet another arrangement, a group of computers receives multiple tasks. The multiple tasks are distributed among the computers in the group by a control computer. The control computer allocates tasks among the computers in the group and endeavors to ensure that each computer in the group has the same amount of work so that the computing load is balanced. If a group of computer does not have a balanced load, some of the computers can be idle while other computers can be inundated with tasks, thereby reducing the efficiency of the group of computers. Thus, it is important that a group of computers applied to a plurality of computing tasks be load balanced.

A great deal of attention has been given to load balancing computing tasks for groups of computers, both for dedicated processing networks and groups of computers available over the internet. Many such computing groups employ a controller to allocate tasks among the computers in a group. Tasks are sent to the controller, the controller tracks the task load of each computer in the group, and allocates new tasks to those computers having the smallest load. For example, U.S. Pat. No. 6,067,580 describes a distributed computing environment with an integrated work load manager to intelligently dispatch remote procedure calls among available application servers. Similarly, U.S. Pat. No. 6,304,967 discloses a computer network with one or more client computers. The client computers make requests to a first server computer that examines resources available on the first server computer and one or more second server computers and allocates the requests to load balance the requests among the first and second server computers. However, this approach requires the use of a controlling or allocating computer to distribute and track computing tasks and computer loads. Furthermore, the computing resources necessary to complete some indeterminate computing tasks, such as some image rendering tasks, are very unpredictable. Hence, simply tracking task allocation does not necessarily provide effective load balancing in a group of server computers, since a server computer could have fewer tasks but more work. Moreover, the controlling computer can itself create a bottleneck in the system.

In another approach described in U.S. Pat. No. 5,603,031, a distributed computing environment employs agent processes that direct their own movement through a computer network. Agent processes can clone themselves when traveling along different network paths. Another method for balancing loads among server computers is described in U.S. Pat. No. 7,284,067. In this method, a load-balancing module is provided for each server and includes multiple network ports for receiving network traffic and coupling messages to its server or another module. Each module monitors the loading and health of its server and provides this information to the other modules. One or more master modules are directly connected to an external network and route received traffic based on a priority system. While these approaches provide a more distributed control and monitoring structure, they do not necessarily allocate indeterminate computing tasks effectively over a network of computers. Furthermore, the use of central task allocation modules creates potential computing bottlenecks and the need to monitor and communicate the status of each server to every other server creates overhead that can reduce the overall efficiency of the system.

Task responsiveness is an important characteristic of any computer application running on a computer network. Efficiency and especially responsiveness, are important issues for network service providers. In typical systems, a plurality of distributed client computers interacts with a different plurality of servers to perform a wide variety of different tasks. Since the tasks are often interactive and depend on a variety of different users with different objective, the tasks tend to be unpredictable. Furthermore, as noted above, some of the tasks are indeterminate, that is the amount of time required to complete the task with a known resource cannot be readily determined. Hence, a system in which a task allocation computer distributes tasks to a group of server computers can be inefficient, create a communication or computing bottleneck, and provide poor load balancing. Alternative distributed processing systems can require a large amount of monitoring and communication overhead. Simply increasing the available network bandwidth or computing devices can be expensive. There remains a need, therefore, for improving networked computer services to provide responsive and efficient performance for given network and computing resources.

SUMMARY OF THE INVENTION

A preferred embodiment of the present invention comprises a computer system for allocating computing tasks in a computer network. A plurality of server computers connected to computer network processes tasks that are unequally distributed among the server computers. A server sends a task-available message over the computer network to the remaining server computers to request assistance. The received task-available message is processed by some of the other servers while some servers do not process the message because they are too busy. The servers that process the message respond by requesting a task from the message sending server.

Another preferred embodiment of the present invention includes a computer system for allocating computing tasks in a computer network. A server computer coupled to the computer network includes storage for storing a queue of tasks. The server computer includes a program for sending a task-available message over the coupled computer network for requesting assistance. The server computer receives a request for a task over the computer network in response to the task-available message. In response, the server computer sends a task from the queue of tasks over the computer network to the source of the request for the task.

Another preferred embodiment of the present invention includes a computer system for allocating computing tasks in a computer network. This system comprises a server computer connected to a computer network for receiving a task-available message sent over the computer network from another computer, which message includes a request for assistance. The server computer includes a program for processing the task-available message by sending a request for a task over the computer network to a source of the task-available message and for not processing the task-available message if the server computer includes a stored queue of pending tasks. These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

DETAILED DESCRIPTION OF THE INVENTION

The present invention addresses the efficient allocation of processing tasks, where one or more of the processing tasks can be indeterminate, among a plurality of interconnected computing resources, without necessarily employing a central task allocation resource for task allocation or adjusting task allocation. An indeterminate processing task is one for which it is difficult or impossible to predict the amount of time needed to accomplish the processing task with a given resource. The computing resources can be heterogeneous so that one computing resource can have different computing, communication, or storage capabilities from another. Tasks can originate from a variety of sources and can be initially assigned to any one of the one or more computing resources. The computing resources can be interconnected through a computer communication network, such as an Ethernet network and can be interconnected through the internet. As used herein, a processing task is a task performed by a computer and is also called a computing task, a job, or a task. A computing resource is a computer, for example including a stored program processor with a central processing unit, a memory, and a connection to the computer communication network, also called a network.

Figure 1:
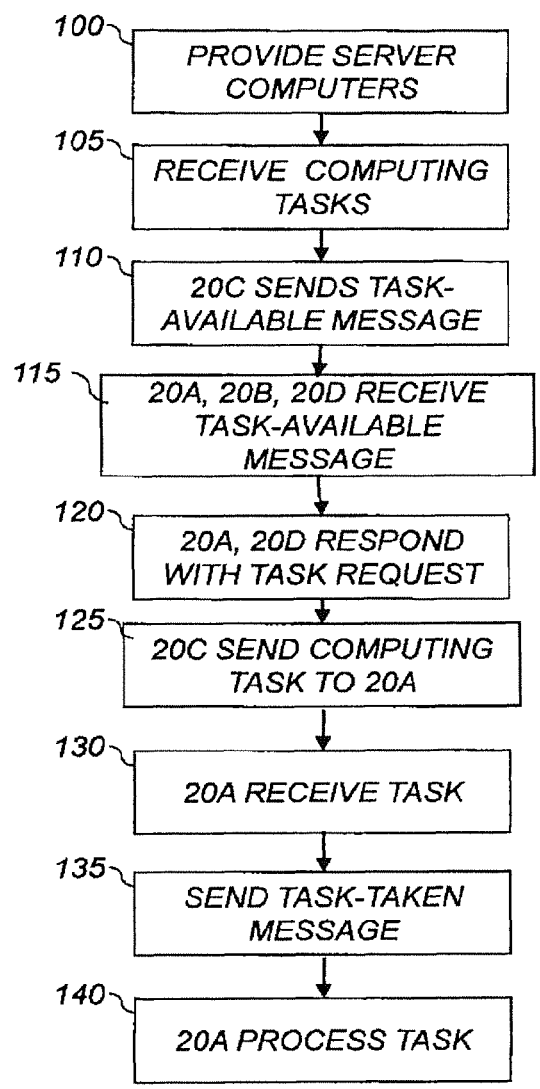
FIG. 1 is a flow diagram illustrating a preferred embodiment of the present invention.
Figure 2A:
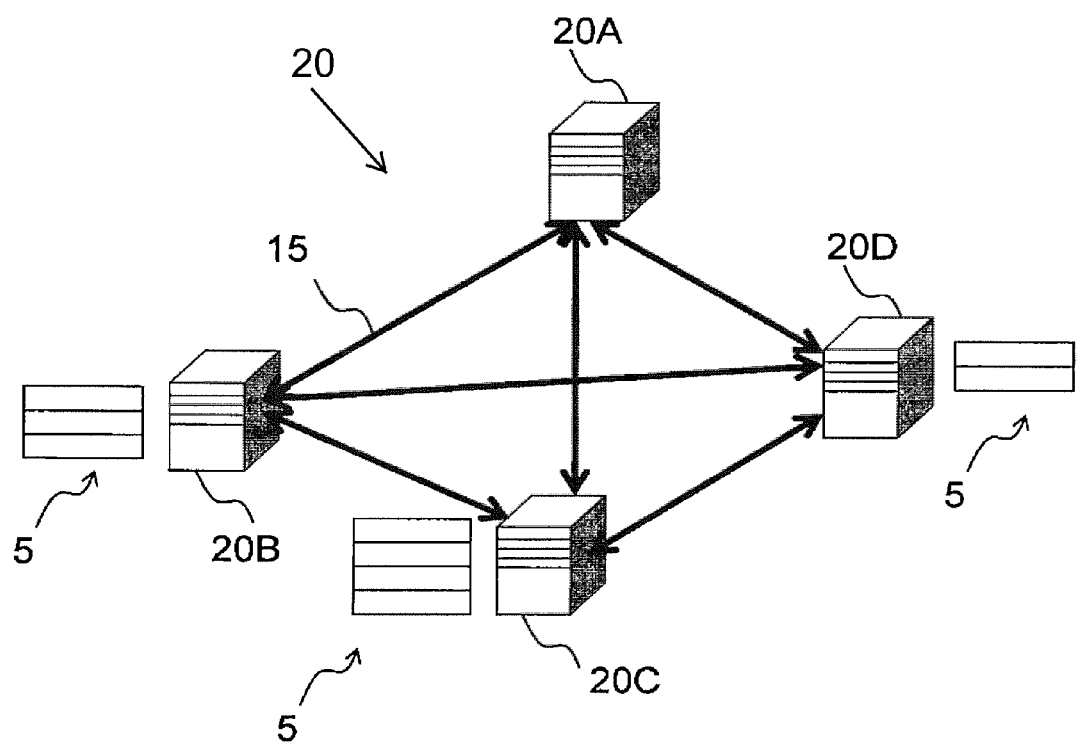
FIGS. 2A-2E are schematic diagrams illustrating a system and methods according a preferred embodiment of the present invention.
Figure 2B:
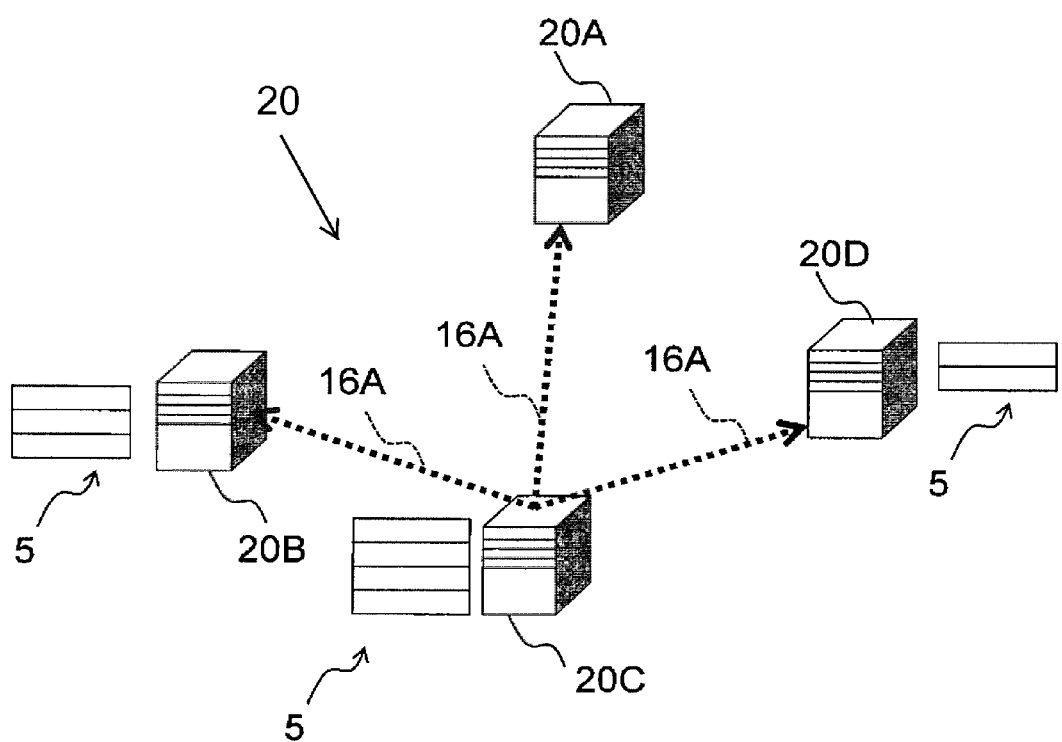

Referring to the flow graph of FIG. 1 and the schematic illustrations of FIGS. 2A-2E, in a preferred embodiment of the present invention, a method of allocating computing tasks in a computer network comprises the steps of providing in step 100 a plurality of server computers 20A-D and a computer network 15, the server computers 20 being interconnected through the computer network 15. A plurality of processing tasks 5 are received in step 105 by, and unequally distributed among, the server computers 20A-D so that some server computers have a heavy task load (e.g. 20B, 20C) and other server computers have a light task load (e.g. 20A) as illustrated in FIG. 2A. The processing tasks are represented as stored in a queue for each corresponding server computer. The task and its associated data for processing may be stored at the server computer together with the task in the queue or the data may be fetched remotely when the task is taken up for processing. In FIG. 2A, communication network 15 is illustrated as a point-to-point network for clarity, although any network that allows each server computer to communicate with all of the other server computers, for example a token-ring network, can be employed. A task-available message is sent in step 110 over the computer network 15 from a first server computer having a heavy task load (e.g. 20C) to all first remaining server computers (e.g. 20A, 20B, 20D), the task-available message requesting assistance. The task-available message is illustrated in FIG. 2B by a dashed network connection line 16A. In FIG. 1, 20C refers to the server computer 20C of FIGS. 2A-2E; likewise 20A refers to server computer 20A and 20D refers to server computer 20D of FIGS. 2A-2E.

Figure 2C:
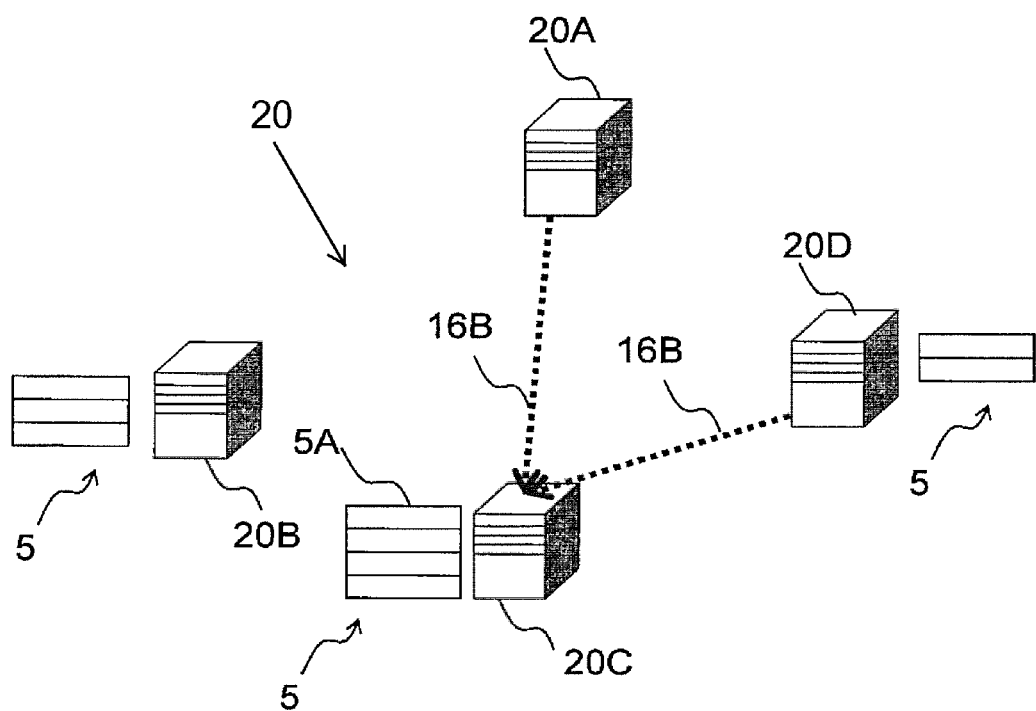
Figure 2D:
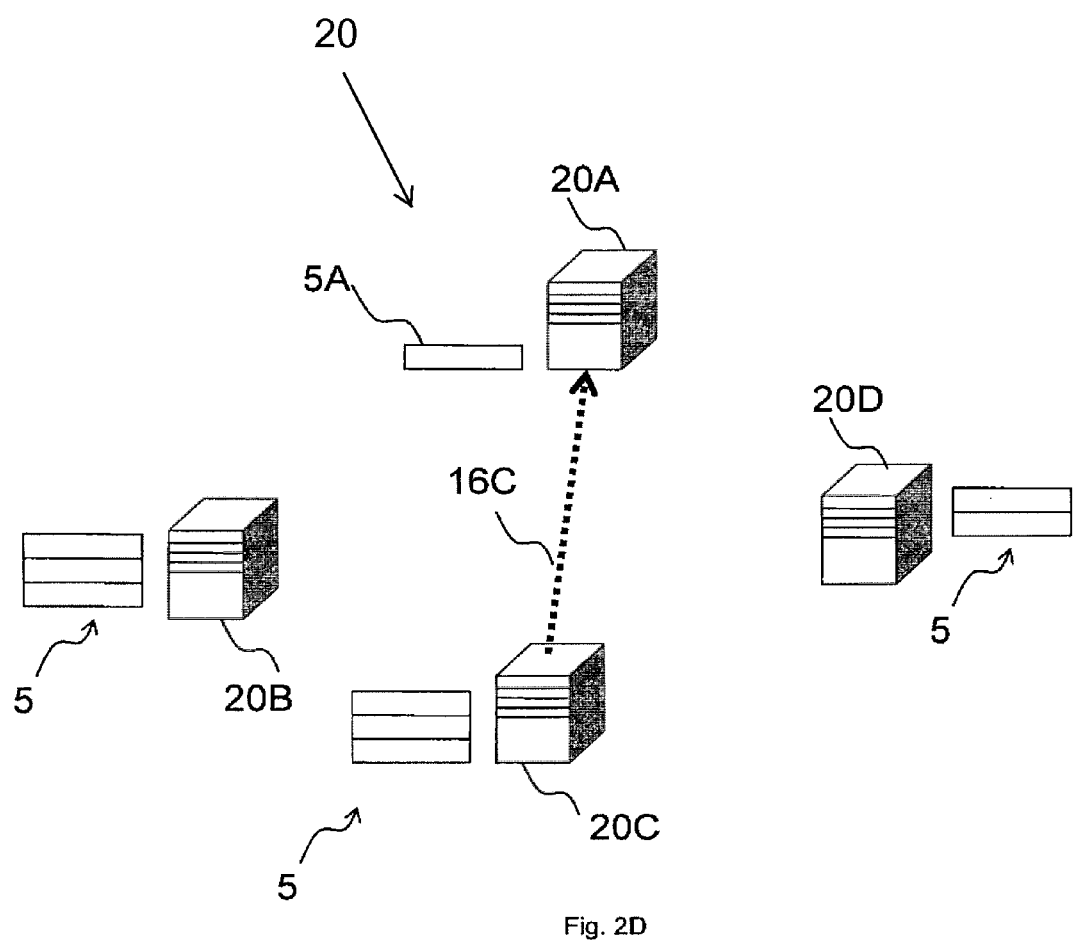

The task-available messages are received by the first remaining server computers (20A, 20B, 20D) in step 115. A first group of first remaining server computers (20A, 20D) process the task-available message and respond with a task-request message, in step 120, while a second group of first remaining server computers (20B) fail to process the task-available message in step 115 as illustrated in FIG. 2C with the dashed network communication 16B. A failure to process the task-available message can include failing to receive and read the message or receiving, reading, and processing the message but choosing not to reply with a task-request message. The task-request message can include status information indicating the present workload of the responding processor. The first server computer receives the task-request messages from the first group of first remaining servers and selects from among them, for example by selecting the message that indicates a processor having the lightest work load, most spare capacity, or the best suited hardware or software attributes. The processor associated with the selected message is then selected. As illustrated in FIG. 2D with the dashed network communication 16C, the first server computer 20C then allocates a task 5A to the selected processor in step 125 by sending a message with the necessary task information and data. The selected processor (20A) receives the task information (step 130) and processes the allocated task in step 140.

Figure 2E:
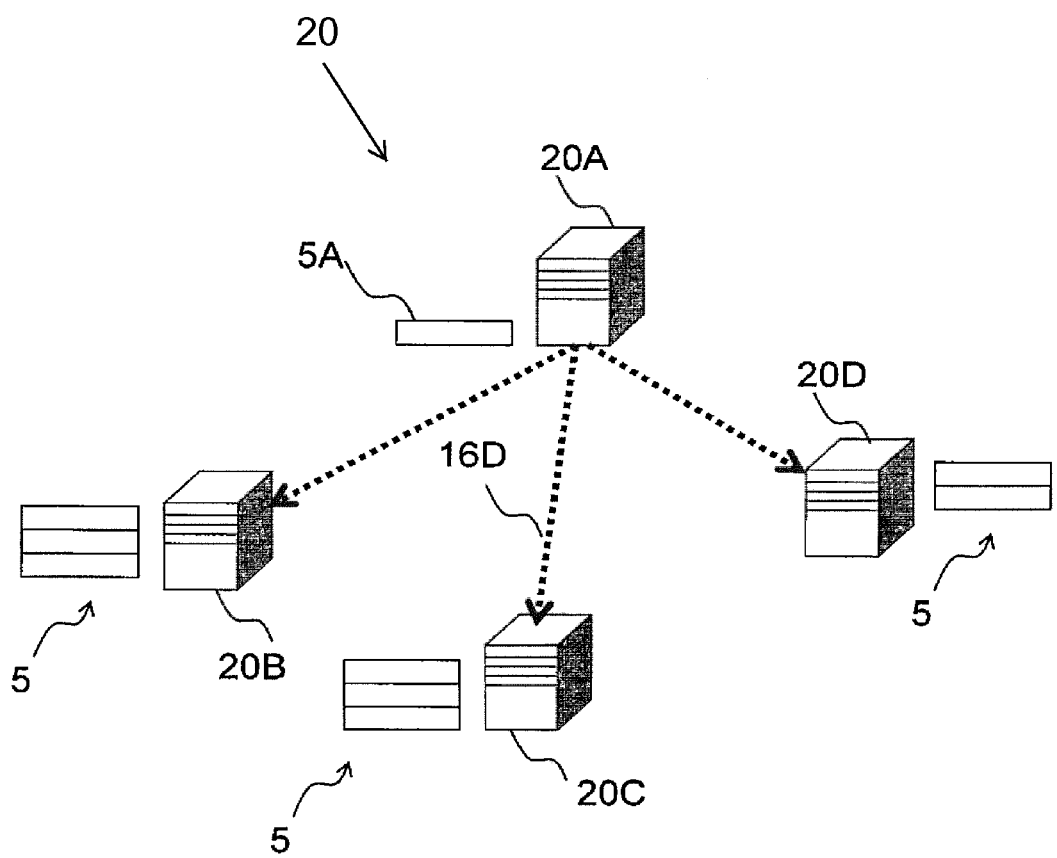

In a further preferred embodiment of the present invention, a task-taken communication is optionally sent from the at least one of the first group of first remaining server computers to the first remaining server computers and received by the first remaining server computers in step 135 and shown in FIG. 2E with communication 16D. Alternatively, the task-taken communication can be sent by the allocating first server (a communication similar to that of FIG. 2B). This optional task-taken communication greatly reduces spurious volunteerism on the part of servers receiving the task-available message, particularly when the task execution variability is high. If the completion of tasks is spread over a relatively longer period of time, servers could volunteer for tasks that have already been assigned, leading to unnecessary communications and delays. By communicating to the remaining servers that a task has been assigned, such unnecessary task requests can be eliminated.

Figure 5:
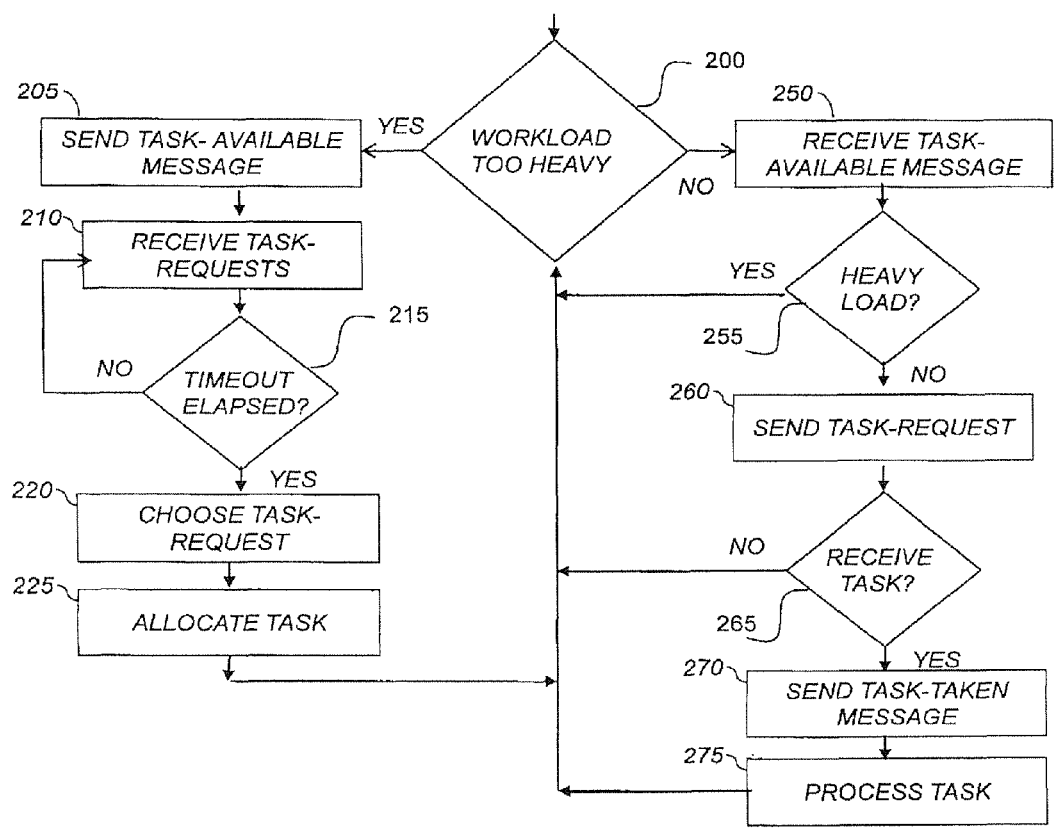
FIG. 5 is a flow diagram illustrating a preferred embodiment of the present invention.

In operation, referring to FIG. 5, a server processes tasks in parallel with receiving or sending messages, depending on the system load. If the system load requires task reallocation (at least one server requiring a task re-allocation), a server monitors its work load to determine if the workload is too heavy (step 200). If the workload is too heavy, a task-available request is sent to the other servers in step 205 and task-request responses are awaited in step 210 for a time-out period (step 215). At the end of the time-out, the task-request response having the lightest load is selected in step 220 and allocated a task in step 225. If the server does not have a workload that is too heavy (step 200), the server awaits a task-available message in step 250. When such a message is received, the server determines if its workload is too heavy (step 255) and, if not, sends a task-request message to the overloaded server in step 260. A task is awaited, for example for a timeout period, in step 265 and when received, a task-taken message is broadcast in step 270, and the allocated task is processed in step 275.

According to various preferred embodiments of the present invention, it is difficult to predict the computing cost of rendering images. Hence, the present invention is well suited to that task whereas traditional load balancing as is known in the art can be ineffective. In one preferred embodiment of the present invention, the processing task is indeterminate. The processing task can be an image processing or image rendering task. In another preferred embodiment of the present invention, the ability of a server computer to respond to a task-available message depends on the workload of the server computer. For example, in one preferred embodiment the second group of first remaining server computers fails to process the task-available message because they have a heavy task load. In another preferred embodiment, the first group of first remaining server computers processes the task-available message because the first remaining server computers in the first group have a light task load.

In further preferred embodiments of the present invention, the steps of FIG. 1 can be repeated with different or the same server computers or first and second groups of server computers. As task processing proceeds, some server computers that were once heavily loaded will become lightly loaded and vice versa. For example, a preferred embodiment of a method of the present invention can include sending a second task-available message over the computer network from a second server computer having a heavy task load to all second remaining server computers, the second task-available message requesting assistance and then receiving the second task-available message by the second remaining server computers, a first group of second remaining server computers processing the second task-available message and a second group of second remaining server computers failing to process the second task-available message, and at least one of the first group of second remaining server computers responding to the second task-available message with a task-request message, receiving a second task allocated from the second server computer, and processing the second allocated task.

The first server computer can be the same computer as the second server computer or it can be a different server computer. Likewise, the first group of second remaining server computers can be different from the first group of first remaining server computers and the second group of second remaining server computers can be different from the second group of first remaining server computers. Alternatively, the first and second groups can be the same.

Figure 6:
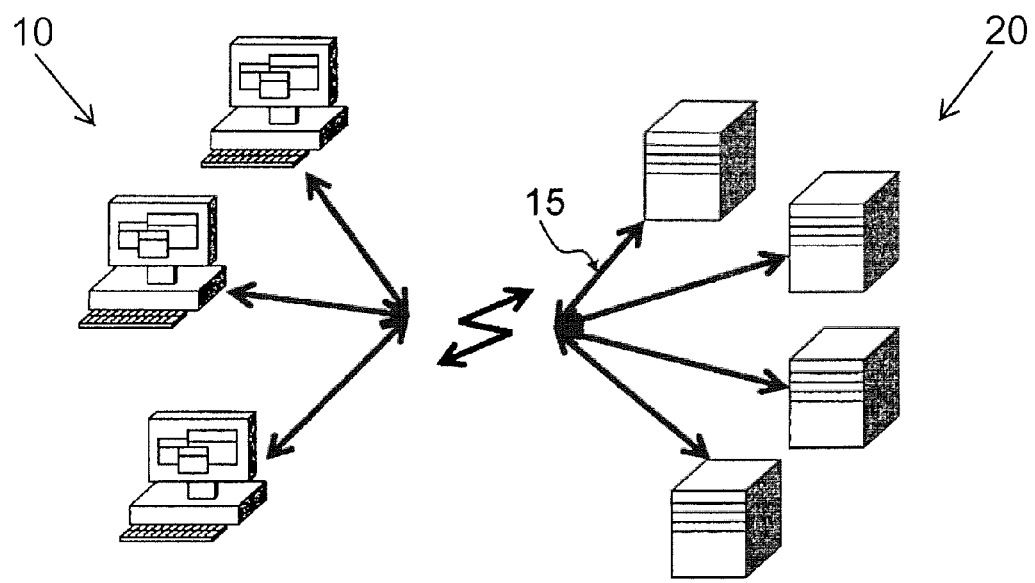
FIG. 6 is a prior-art computer system and network.

According to a preferred embodiment of the present invention, the plurality of processing tasks can be received from a plurality of different sources on the computer network and each of the plurality of sources can independently provide work to different ones of the plurality of server computers. For example, the plurality of different sources can be remote client computers 10 as illustrated in FIG. 6. According to various preferred embodiments of the present invention, the tasks can be independently received by the various servers or can be received from a central task allocation server. According to preferred embodiments of the present invention, allocated tasks are re-allocated to different servers independently of any such task allocation server.

Preferred embodiments of the present invention have the advantage of effectively managing a diverse set of server computers and client computers with different processing, communication, and storage capabilities, without additional management overhead. In one alternative approach for re-allocating tasks as suggested by the prior art, processors are not expected to be overloaded since a central task allocation resource receives all of the tasks and allocates them to servers so as to provide each server with a similar number of tasks. However, if the tasks are indeterminate, some servers can still have too much work compared to other processors. Servers could be required to communicate with a central server each time a task is complete, and then receive a new task. However, this approach leaves servers with no work until a new task is allocated, increases communication requirements, and requires that the central server store all tasks.

Alternatively, in the absence of a central task re-allocation server, servers could communicate with each other to re-allocate tasks using a conventional communication protocol in which each processor is required to respond to each communication. Such a protocol requires that each processor place a higher priority on communication than on task processing, so that communication responses are guaranteed to be timely. Such a protocol then reduces the computing power available for processing tasks. Furthermore, if a communication is not responded to in a timely fashion, the communicating processor must repeat the communication until a response is received, further increasing communication requirements, delaying task re-allocation, and reducing the time available for processing tasks.

For example, an initial request for assistance is broadcast to n servers, n responses are then received, one is selected, and a task is allocated, for a total of 1+n+1 messages sent from or received by the communicating processor. In this example, 20 percent of the processors have a relatively light work-load (an arbitrary assumption that in practice will depend on the nature of the tasks and desired behavior of servers having various workloads). In contrast, according to preferred embodiments of the present invention, only the 20 percent of processors having a light work load need respond, for a total of 1+n/5+1 messages, a significant reduction, especially for a large number of servers and a shared communication network path. However, in this example, all of the communications are responded to immediately, requiring that communication have a higher priority than task processing, reducing the computing power available for task processing.

In a second example in which task processing is given equivalent or higher priority than communication, 80 percent of the processors can fail to respond to the initial task-available message. In this case, the requesting server must send a second broadcast message requesting assistance and await a second set of replies. The number of messages is then 1+n+1+n+1 or, if the servers who responded to the first message request are excluded, 1+n/5+1+4n/5+1. If point-to-point messages are used (rather than broadcast), 1+n+n+1 messages are required in the first case and 1+n+n/5+4n/5+4n/5+1 are required in the second case, rather than the 2+n/5 messages of this preferred embodiment of the present invention. Even more problematic is the delay in task allocation while the messages are exchanged.

Systems that simply randomly assign new tasks to processors run the risk of overloading some server computers while starving other server computers of work. The use of task allocation software or hardware increases overhead costs and creates potential processing bottlenecks. Other tools that provide guaranteed communication of status and resources among server computers on a network require a significant bandwidth and overhead. Moreover, the overhead required for task allocation or guaranteed communication does not scale well to larger groups of server computers.

According to preferred embodiments of the present invention, these limitations are substantially overcome without a great increase in computing hardware, bandwidth, or overhead. Idle processors can request tasks from every server computer but only those that have available computing cycles need, or can, respond. Since many tasks are typically distributed in short periods of time, if one server computer is unable to respond to one request, it is likely to be able to respond to a following request, so that over time the work load is balanced without the need for guaranteed communications and response, status or resource communication, centralized task allocation, or additional management hardware. Although, on an instantaneous basis, the system of some preferred embodiments of the present invention is not fair (that is, the load balancing is not guaranteed to be optimal) over time the system is self-correcting and load balancing and very robust, as well as scaling effectively with little overhead and oversight. Moreover, preferred embodiments of the present invention adapt well to a wide variety of computing resources and bandwidth and to changes in the available resources and bandwidth.

According to preferred embodiments of the present invention, servers do not have to respond to task-available messages. This enables task processing to be done at the highest priority, improving task throughput, and increases available network bandwidth by reducing unnecessary messages. No central task re-allocation server is necessary. An important feature of preferred embodiments of the present invention is that the method and system of preferred embodiments of the present invention scale to very large number of processors very efficiently. In a typical system, a single computer network is provided, so that while the number of servers and tasks increase to handle an increasing work load, the available bandwidth does not increase. Similarly, if a central task re-allocator were employed, it would likewise serve as a limiting element in the processing system. Hence, preferred embodiments of the present invention provide improved processing efficiency, reduced bandwidth requirements, and greatly improved scalability to large systems.

Preferred embodiments of the present invention can be implemented in a computer system that comprises: a plurality of server computers and a computer network, the server computers being interconnected through the computer network; a plurality of processing tasks unequally distributed among the server computers so that some server computers have a heavy task load and other server computers have a light task load; software for sending a task-available message over the computer network from a first server computer having a heavy task load to all first remaining server computers, the task-available message requesting assistance; software for receiving the task-available message by a first remaining server computers, a first group of first remaining server computers processing the task-available message and a second group of first remaining server computers failing to process the task-available message; and software for at least one of the first group of first remaining server computers to respond to the task-available message by requesting a task; the first server selecting one of the first remaining server computers and allocating a task to the selected first remaining server computer.

Figure 3:
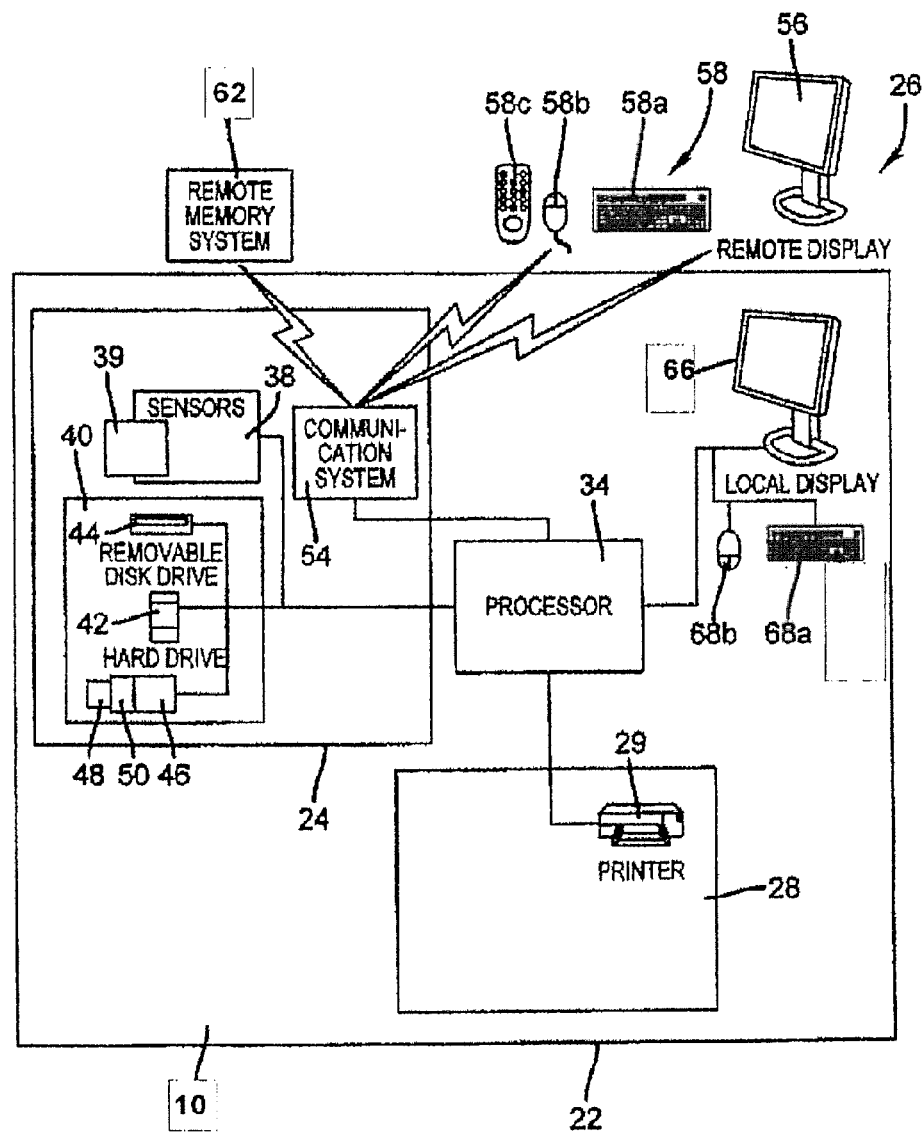
FIG. 3 is a processing system useful for the present invention.

Preferred embodiments of the present invention are adapted to receive images and provide processed images that can be used to make image prints or other image-related products. FIG. 3 illustrates a first preferred embodiment of an electronic computer system 10 that can be used as a server or client computer for processing or providing image files for preferred embodiments of the present invention. In the preferred embodiment of FIG. 3, the computer system 10 comprises a housing 22 and a source of image data files such as digital images that have been prepared by or using other devices. In the preferred embodiment of FIG. 3, source of image data files 24 includes sensors 38, a memory 40 and a communication system 54.

Sensors 38 are optional and can include light sensors, a camera and other sensors known in the art that can be used to obtain digital images in the environment of the system 10 and to convert this information into a form that can be used by processor 34 of the system. Sensors 38 can also include one or more video sensors 39 that are adapted to capture images.

Memory 40 can include conventional memory devices including solid state, magnetic, optical or other data storage devices for storing images, image products, etc. Memory 40 can be fixed within the system or it can be removable. In the preferred embodiment of FIG. 3, the system 10 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, image processing software, control programs, digital images and metadata can also be stored in a remote memory system 52.

In the preferred embodiment shown in FIG. 3, communication system 54 that in this preferred embodiment can be used to communicate with an optional remote memory system 52, an optional a remote display 56, and/or optional remote input 58. A remote input station including a remote display 56 and/or remote input controls 58 (also referred to herein as "remote input 58") can communicate with communication system 54 wirelessly as illustrated or can communicate in a wired fashion. In an alternative preferred embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input system 26 provides a way for a user of the system to provide instructions to processor 34. This allows such a user to make a designation of image data files to be used in generating digital images and product specifications and to select an output form for the output product. User input system 26 can also be used for a variety of other purposes including, but not limited to, allowing a user to arrange, organize and edit digital images and products to be incorporated into the image product, to provide information about the user or audience, to provide annotation data such as voice and text data, to identify characters in the content data files, and to perform such other interactions with the system.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the preferred embodiment shown in FIG. 3, user input system 26 includes an optional remote input 58 including a remote keyboard 58a, a remote mouse 58b, and a remote control 58c and a local input 68 including a local keyboard 68a and a local mouse 68b.

Figure 4:
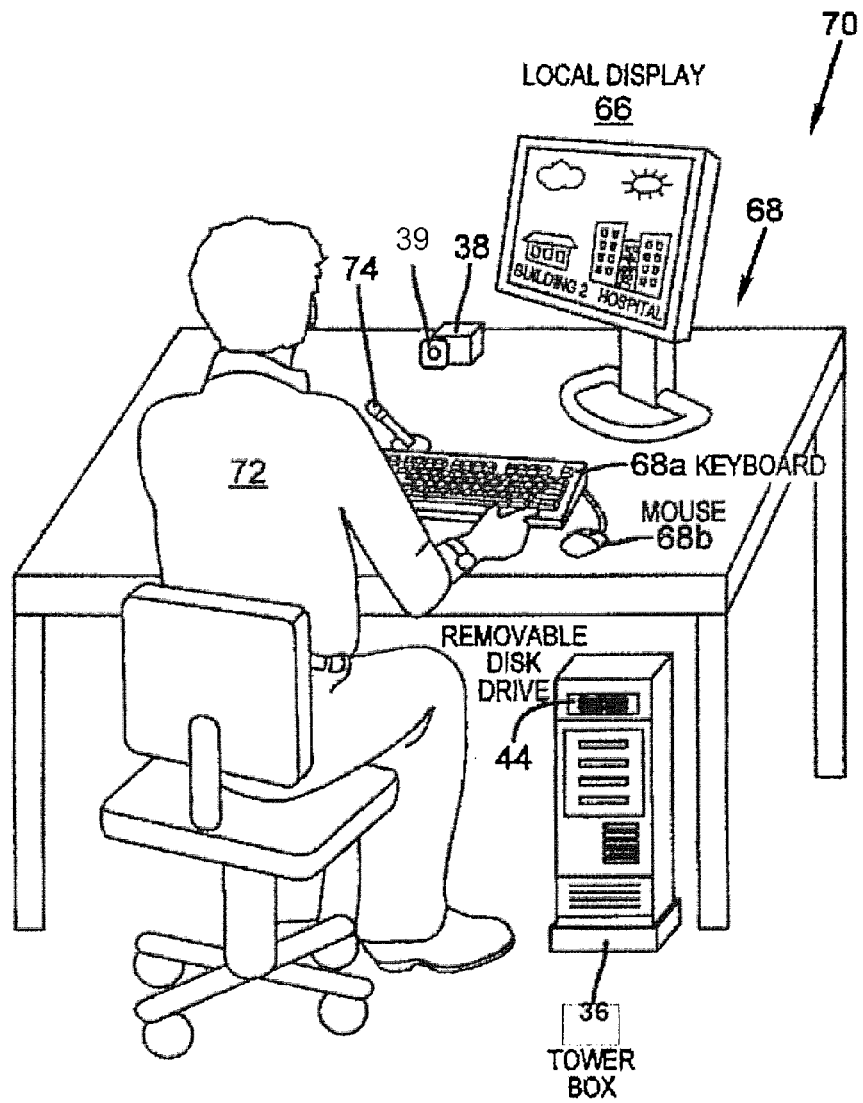
FIG. 4 is a typical processing system setup for user interaction.

As is illustrated in FIG. 4, client input 68 can take the form of an editing studio or kiosk 70 (hereafter also referred to as an "editing area 70"). In this illustration, a user 72 is seated before a console comprising local keyboard 68a and mouse 68b and a local display 66 which is capable, for example, of displaying multimedia content. As is also illustrated in FIG. 4, editing area 70 can also have sensors 38 including, but not limited to, video sensors 39, and other sensors. As is also illustrated in FIG. 6 the editing studio can include a tower box 36 with a removable disk drive 44.

Output system 28 is used for rendering images, text or other graphical representations in a manner that allows digital images and product specifications to be designed and recorded. In this regard, output system 28 can comprise any conventional structure or system that is known for printing rendered image products such as on printer 29. Printer 29 can record images on a tangible surface 30 using a variety of known technologies. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale or sepia toned images.

In certain preferred embodiments, the source of content data files 24, user input system 26 and output system 28 can share components. Processor 34 operates system based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

Preferred embodiments of the present invention can be employed to support business conducted over the internet, in particular for businesses that employ large amounts of digital storage and image processing, such as image printing for a client that interacts with a server and image storage system. It has been shown that improved responsiveness, improved computational efficiency, and reduced complexity are provided by using the various preferred embodiments of the present invention.

Preferred embodiments of the invention have been described in detail with particular reference to certain preferred embodiments thereof, but it will be understood that variations and modifications can be effected within the spirit and scope of the invention.

PARTS LIST 5 processing tasks
5A processing task
10 client computer
15 network
16A network communication
16B network communication
16C network communication
16D network communication
20 server system
20A server
20B server
20C server
20D server
100 provide server computers step
105 receive processing tasks step
110 send task-available message step
115 receive task-available message step
120 respond with task request step 125 send computing task step
130 receive task step
135 send task-taken message step
140 process task step
200 workload too high step
205 send task-available message step
210 receive task-requests step
215 timeout elapsed step
220 choose task request step
225 allocate task step
250 receive task-available message step
255 heavy load? step
260 send task request step
265 receive task? Step
270 send task-taken message step
275 process task step

The invention claimed is:

1. A computer system for allocating computing tasks in a computer network, the computer system comprising:
    a plurality of server computers, each including at least one hardware element and each connected to the computer network, wherein the plurality of server computers receives variable loads of computing tasks from a plurality of different sources connected to the computer network;
    software on each server computer adapted to send task-available messages over the computer network to all other server computers connected to the computer network, wherein a task available message requests assistance with processing a computing task and wherein a server computer sends a task-available message when it has a heavy task load;
    software on each server computer adapted to receive task-available messages;
    software on each server computer adapted to process task-available messages, wherein for each task-available message, a first group of receiving server computers processes the task-available message and a second group of receiving server computers fails to process the task-available message; and
    software on each server computer adapted to respond to processed task-available messages by requesting a task from a server computer that sends a task-available message.

2. The computer system of claim 1, wherein the second group of receiving server computers fails to process the task-available message because the second group of receiving server computers have a heavy task load.

3. The computer system of claim 1, wherein the first group of receiving server computers processes the task-available message because the first group of receiving server computers have a light task load.

4. The computer system of claim 1, wherein the computing tasks are image-rendering tasks.

5. The computer system of claim 1, wherein a first server computer sends a first task-available message and a second task-available message consecutively to all other server computers.

6. The computer system of claim 5, wherein a first group of the other server computers processes the first task-available message, wherein a second group of the other server computers processes the second task-available message, and wherein the first group of the other server computers is not the same as the second group of the other server computers.

7. The computer system of claim 1, wherein a first server computer sends a first task-available message to a first set of remaining server computers, wherein a second server computer sends a second task-available message to a second set of remaining server computers, wherein the first set of remaining server computers comprises all server computers connected to the computer network except the first server computer, and wherein the second set of remaining server computers comprises all server computers connected to the computer network except the second server computer.

8. The computer system of claim 7, wherein at least one of the first set of remaining server computers processes and responds to the first task-available message, and wherein at least one of the second set of remaining server computers processes and responds to the second task-available message.

9. The computer system of claim 8, wherein the at least one of the first set of remaining server computers that processes and responds to the first task-available message is not the same as the at least one of the second set of remaining server computers that processes and responds to the second task-available message.

10. The computer system of claim 1, wherein each of the plurality of different sources provides work to one of the plurality of server computers independently.

11. The computer system of claim 10, wherein the one or more different sources are remote client computers on the computer network.

12. The computer system of claim 1, wherein the server computers have similar computing attributes.

13. The computer system of claim 1, wherein the server computers have dissimilar computing attributes.

14. The computer system of claim 1, wherein the computer network is the internet.

15. The computer system of claim 1, further comprising software on each server computer adapted to allocate a computing task to any other server computer that responds to a task-available message.

16. A computer system for allocating computing tasks in a computer network, the computer system comprising:
    a first server computer connected to the computer network, comprising at least one hardware component, wherein the server computer is adapted to receive a task-available message sent over the computer network from a second server computer, and wherein the task-available message requests assistance with processing a computing task; and
    a program on the first server computer adapted to process the task-available message and respond to the task-available message by sending a request for a computing task over the computer network to the second server computer, wherein the program is further adapted not to respond to the task-available message if the first server computer includes a stored queue of pending tasks.

* * * * *